United States Patent
Aromin

(10) Patent No.: US 9,466,971 B2
(45) Date of Patent: Oct. 11, 2016

(54) MINI APPLIANCE LEAKAGE CURRENT INTERRUPTER CIRCUIT AND HOUSING EMBODIMENTS

(71) Applicant: Victor V Aromin, West Warwick, RI (US)

(72) Inventor: Victor V Aromin, West Warwick, RI (US)

(73) Assignee: TOWER MFG CORP, Providence, RI (US)

( * ) Notice: Subject to any disclaimer, the term of this patent is extended or adjusted under 35 U.S.C. 154(b) by 109 days.

(21) Appl. No.: 14/163,779

(22) Filed: Jan. 24, 2014

(65) Prior Publication Data

US 2015/0214719 A1   Jul. 30, 2015

(51) Int. Cl.

| | |
|---|---|
| *H02H 3/00* | (2006.01) |
| *H02H 9/08* | (2006.01) |
| *H02H 3/33* | (2006.01) |
| *H01R 13/713* | (2006.01) |
| *H01R 24/30* | (2011.01) |

(52) U.S. Cl.
CPC ............ *H02H 3/33* (2013.01); *H01R 13/7135* (2013.01); *H01R 24/30* (2013.01)

(58) Field of Classification Search
CPC .............................. H02H 1/0007; H02H 3/16
USPC .......................................................... 361/42
See application file for complete search history.

(56) References Cited

U.S. PATENT DOCUMENTS

| | | |
|---|---|---|
| 3,366,843 A | 1/1968 | Evalds |
| 3,569,781 A | 3/1971 | Strachan |
| 3,653,223 A | 4/1972 | Jones et al. |
| 3,728,702 A | 4/1973 | Mamoru et al. |
| 3,936,699 A | 2/1976 | Adams |
| 4,428,635 A | 1/1984 | Hamsher, Jr. et al. |
| 4,468,073 A | 8/1984 | Machcinski |
| 4,720,275 A | 1/1988 | Swart et al. |
| 5,148,344 A | 9/1992 | Rao et al. |
| 5,183,413 A | 2/1993 | Lazaro, Jr. et al. |
| 5,320,558 A | 6/1994 | von Roretz |
| 5,642,248 A | 6/1997 | Campolo et al. |
| 5,757,598 A | 5/1998 | Aromin |
| 5,943,199 A | 8/1999 | Aromin |
| 6,052,266 A | 4/2000 | Aromin |
| 6,122,155 A * | 9/2000 | Aromin et al. .................. 361/42 |
| 6,181,541 B1 | 1/2001 | Souri et al. |
| 6,210,208 B1 | 4/2001 | Barnes et al. |
| 6,218,647 B1 | 4/2001 | Jones |

(Continued)

FOREIGN PATENT DOCUMENTS

| | | |
|---|---|---|
| EP | 0831570 | 3/1998 |
| WO | WO-2010/011321 | 1/2010 |

OTHER PUBLICATIONS

US 8,072,717, 12/2011, Radosavljevic et al. (withdrawn)

*Primary Examiner* — Thienvu Tran
*Assistant Examiner* — Lucy Thomas

(57) ABSTRACT

An appliance leakage current interrupter (ALCI) for interrupting the flow of current through a pair of lines extending between a source of power and a load. The appliance leakage current interrupter having a housing integrating components that would normally be positioned on an ALCI circuit board. The ALCI having a prong assembly for supplying power from a source of power to the remainder of the ALCI, the prong assembly having first and second contact prongs which are in a first embodiment integrated into an ALCI circuit and in a second embodiment integrated into the housing assembly.

9 Claims, 29 Drawing Sheets

(56) References Cited

U.S. PATENT DOCUMENTS

| | | |
|---|---|---|
| 6,332,783 B1 * | 12/2001 | Ukiya et al. ............... 439/76.1 |
| 6,525,914 B1 | 2/2003 | Legatti |
| 6,541,723 B1 | 4/2003 | Rao et al. |
| 6,738,241 B1 | 5/2004 | Aromin |
| 6,802,741 B1 | 10/2004 | Shatkin |
| 6,829,123 B2 | 12/2004 | Legatti et al. |
| 6,963,477 B2 | 11/2005 | Ikeda |
| 6,991,495 B1 | 1/2006 | Aromin |
| 7,179,992 B1 | 2/2007 | Packard et al. |
| 7,358,443 B2 | 4/2008 | Shatkin et al. |
| 7,358,654 B2 | 4/2008 | Aromin |
| 7,419,405 B1 | 9/2008 | Landes et al. |
| 7,423,854 B2 | 9/2008 | Gandolfi et al. |
| 7,525,777 B2 | 4/2009 | Aromin |
| 7,684,162 B2 | 3/2010 | Musat et al. |
| 8,475,136 B2 | 7/2013 | Jayanth |
| 8,493,697 B2 | 7/2013 | Wallmeir |
| 2004/0070899 A1 | 4/2004 | Gershen et al. |
| 2011/0095621 A1 | 4/2011 | Petersen |
| 2012/0052702 A1 * | 3/2012 | Zou ............................ 439/95 |

* cited by examiner

MINI APPLIANCE LEAKAGE CURRENT INTERRUPTER CIRCUIT AND HOUSING EMBODIMENTS

BACKGROUND

1. Field of Use

The present invention relates generally to ground fault safety devices and more specifically to appliance leakage current interrupter circuits and housings.

2. Description of Prior Art

It is well known for electrical appliances, such as hair dryers, to draw electrical power through connection to a power source, such as an electrical outlet. Specifically, the electrical appliance (which serves as the load of the electrical system) is connected to the power source by a pair of current-carrying wires. The pair of current-carrying wires typically include a hot wire and a neutral wire, the pair of wires having equal but opposite magnitudes under normal conditions.

On occasion, the electrical system may experience a ground fault condition while the load is connected to the power supply. A ground fault condition occurs when the differential between the values of the currents of the two wires exceeds a predetermined value. Often a ground fault will occur if the hot line becomes inadvertently grounded. A ground fault condition can result in a loss of power to the electrical appliance because current is unable to flow to the load. As a consequence, an excessive amount of current tends to flow into the ground conductor of the electrical, system which, in turn, creates dangerous voltage levels at points in the circuit that should be at ground potential. This condition can result in potentially dangerous electrical shocks, which could seriously injure an individual.

Accordingly, ground fault safety devices are commonly employed in such electrical systems to eliminate ground fault conditions. One type of ground fault safety device is the ground fault circuit interrupter (GFCI). Another type of ground fault safety device is the appliance leakage current interrupter (ALCI). Ground fault circuit interrupters are used to eliminate ground fault conditions as well as grounded neutral conditions, whereas appliance leakage current interrupter are used only to eliminate ground fault conditions. Both types of ground fault safety devices prevent ground fault conditions from occurring by opening the electric circuit upon the detection of a ground fault condition in the pair of wires. It is known to incorporate GFCI's and ALCI's into electrical plugs, electrical switches and electrical receptacles.

ALCIs are commonly mounted within a generally rectangular housing having a top, a bottom, a front end and a rear end. The housing is attached to the appliance by an electrical cord which extends into the housing from the rear end. A pair of prongs (blades) typically extend out from the housing and are sized, shaped and spaced away from each other so that they can be inserted into the sockets of an electrical outlet, thus making contact and closing the circuit.

BRIEF SUMMARY

It is an object of this invention to provide a new and improved ALCI.

It is another object of this invention to provide an ALCI as described above wherein the circuitry of the ALCI is contained within a generally rectangular housing which is very small in size.

It is yet another object of this invention to provide an ALCI as described above for use with household appliances such as hair dryer.

It is still another object of this invention to provide an ALCI as described above wherein the ALCI is constructed so as to also serve as a plug for connecting the appliance to an electrical outlet.

It is another object of this invention to provide an ALCI as described above which has a limited number of parts, which is easy to use and which is inexpensive to manufacture.

It is yet another object of the present invention to provide an ALCI having a partially separable wire cover housing for easy connection of load conductors.

It is yet another object of the present invention to provide an ALCI having a wire securement bushing, located under the partially separable wire cover housing.

It is yet another object of the present invention to provide an ALCI having a housing with integrated source input conductors.

It is yet another object of the present invention to provide an ALCI having a housing integrating components that would normally be positioned on the ALCI circuit board.

Accordingly, there is provided an appliance leakage current interrupter (ALCI) for interrupting the flow of current through a pair of lines extending between a source of power and a load, said appliance leakage current interrupter comprising a housing having a top, a bottom, a wire cover easily separable for quick load connect, a front end and a rear end, a load input securement bushing adaptable for engagement into channels located, within the wire cover and bottom housing, and a prong assembly for supplying power from the source of power to the remainder of said appliance leakage current interrupter, said prong assembly comprising, first and second contact prongs which are in a first embodiment integrated into an ALCI circuit and in a second embodiment integrated into a bottom housing assembly.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following, detailed description is therefore, not to be taken in a limiting sense.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 27:
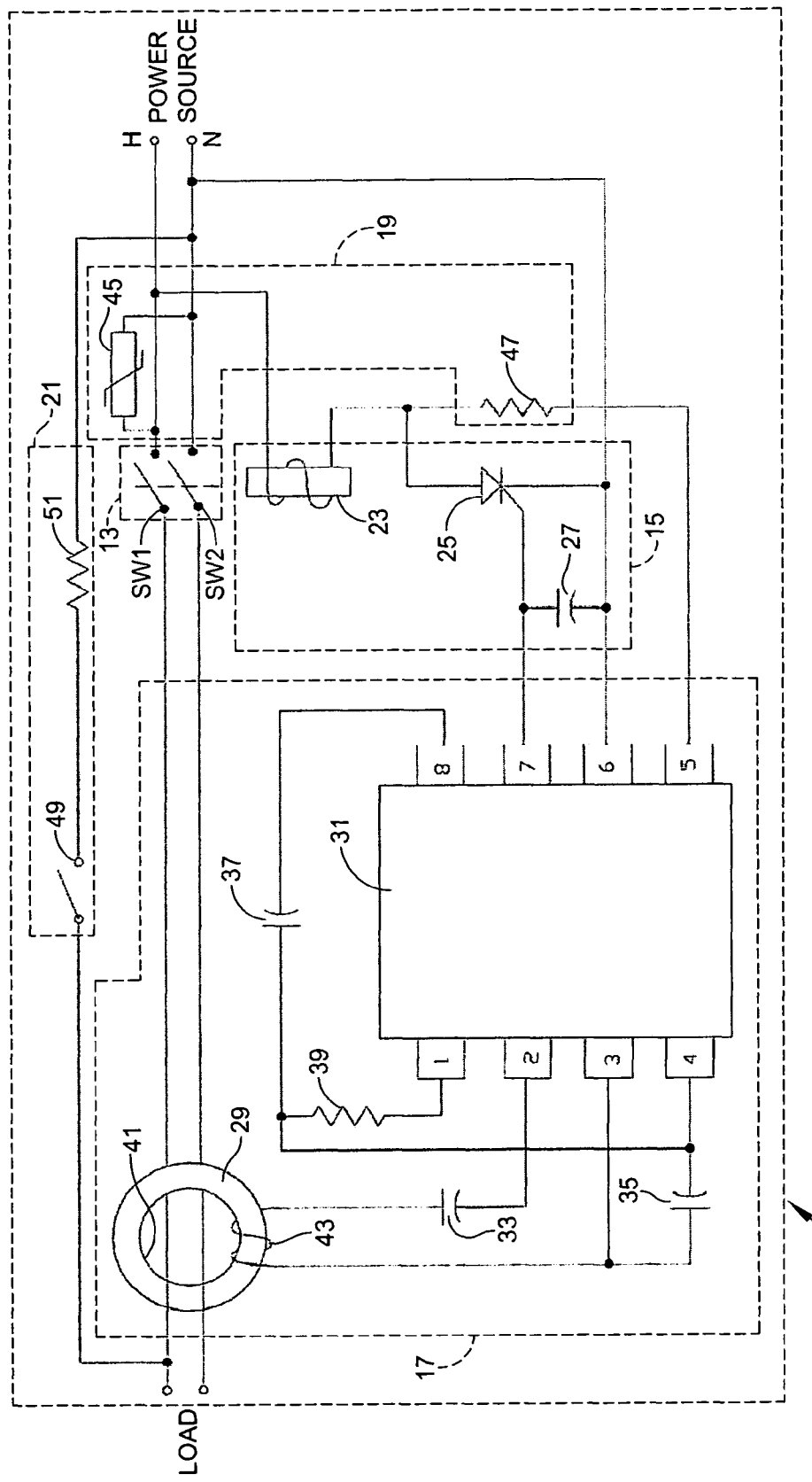
FIGS. 27-29 illustrate schematic diagrams of different circuits that are adaptable to be disposed on the physical circuit layouts illustrated in FIGS. 5-6, and 15-17.

Referring to FIG. 27, there is shown a circuit diagram for a miniature appliance leakage current interrupter (ALCI) constructed in accordance with the principles of the present invention, the ALCI being designated as reference numeral 11. Appliance leakage current interrupter 11 includes a circuit breaker 13, a relay circuit 15, a fault detection circuit 17, a power supply circuit 19 and a test circuit 21. It is understood that the circuit components illustrated in FIG. 27 may be arranged on the circuit card assemblies as illustrated in FIGS. 5-6, and FIGS. 15-17.

Appliance leakage current interrupter 11 is electrically connected to the pair of current carrying wires which connect a load to a power source. The pair of current carrying wires include a hot line (or wire) H and a neutral line (or wire) N, lines H and N having equal but opposite magnitudes under normal conditions. It is the function of ALCI 11 to interrupt the flow of current through lines H and L upon detection of a ground fault condition, which will be discussed in detail below.

Circuit breaker 13 comprises a pair of tonally closed switches SW1 and SW2 which are located in the hot and neutral lines, respectively, between the power source and the load. Switches SW1 and SW2 remain in the closed position until such time as fault detection circuit 17 detects the presence of a ground fault condition, at which time switches SW1 and SW2 open. Once open, switches SW1 and SW2 remain open until a reset button (to be discussed in detail below) is manually depressed to close the switches.

Relay circuit 15 comprises a solenoid 23, a silicon controlled rectifier (SCR) 25 and a capacitor 27. Solenoid 23 is connected to hot line H and serves the function of selectively opening switches SW1 and SW2 upon the detection of a ground fault condition. Rectifier 25 is connected to both solenoid 23 and fault detection circuit 17 and serves to energize solenoid 23 upon the detection of a ground fault condition. Rectifier 25 is preferably a model PO110DA rectifier sold by Tensor Corporation. Capacitor 27 is connected in parallel to rectifier 25 and fault detection circuit 17 and serves as a noise suppression filter. Capacitor 27 preferably has a value of 10 nf and acts to filter out noise occurring in circuit 11 which could mistakenly cause SCR 25 to energize solenoid 23. It contrast to ALCI 11, ALCI 10 includes a pair of capacitors which are connected in parallel, the capacitors having values of 2.2 uf and 0.01 uf. Because the relay circuit of ALCI 11 includes one less capacitor than ALCI 10, ALCI 11 is able to be slightly reduced in size.

Fault detection circuit 17 comprises a transformer 29, an integrated circuit (IC) chip 31, a coupling capacitor 33, a noise filter capacitor 35, a timing capacitor 37 and a feedback resistor 39. It is the function of fault detection circuit 17 to detect the presence of a ground fault condition in the hot and neutral lines. Furthermore, upon the detection of a ground fault condition, fault detection circuit 17 generates an output signal which is applied to relay circuit 15 which opens circuit breaker 13.

Transformer 29 includes a laminated core 41 and a multiturn secondary sense winding 43. Laminated core 41 is generally ring shaped and includes three laminated layers or rings. In contrast, the laminated core of ALCI 10 includes five laminated layers; therefore, the transformer of ALCI 11 is substantially smaller than the transformer of ALCI 10. Hot wire H and neutral wire N serve as the primary winding and are wrapped around core 41 twice in order to build up the primary. In contrast, in ALCI 10, wires H and N are only wrapped around the core of the transformer once. Secondary winding 43 is connected to coupling capacitor 33 which, in turn is connected to pin 2 of IC chip 31.

In addition, winding 43 is connected to pin 3 of chip 31 and noise filter capacitor 35 which, in turn, is connected to pin 4 of chip 31. It is the function of transformer 29 to sense current differentials between hot line H and neutral line N and induce an associated output to secondary winding 43. Coupling capacitor 33, which preferably has a value of 10 uf, serves to couple the AC signal of secondary winding 43 before the signal reaches chip 31. Noise filter capacitor 35, which preferably has a value of 0.1 uf, serves to filter out unwanted noise signals before such signals reach chip 31. Integrated circuit chip 31 is preferably an RV4140 model chip manufactured by Raytheon Corporation.

Pin 4 of chip 31 is connected to feedback resistor 39 which, in turn, is connected to pin 1 of chip 31. Pin 4 of chip 31 is also connected to timing capacitor 37 which, in turn, is connected to pin 8 of chip 31. Pins 6 and 7 of chip 31 are connected to capacitor 27 and rectifier 25. It is the function of ground fault interrupter IC chip 31 to amplify the ground fault signal generated by transformer 29 and provide an associated output signal at pin 7. Feedback resistor 39, which preferably has a value between 100 Kohms and 470 Kohms, serves to establish the minimum threshold value of a ground fault condition which will cause an output ground fault signal at pin 7 to pass to relay circuit 15. Timing capacitor 37, which preferably has a value of 0.02 uf serves to work in conjunction with feedback resistor 39 in determining the minimum ground fault current setting.

Power supply circuit 19 comprises a metal oxide varistor 45 and a voltage dropping resistor 47. It is the function of power supply circuit 19 to supply the AC power produced from the power source to pin 5 (the power supply pin) of chip 31. Varistor 45, which preferably has a value of 150 volts, serves to provide voltage surge suppression for circuit 11 from the power source. Resistor 47, which preferably has a value of 82 Kohms, serves to supply the appropriate AC voltage required by IC chip 31. In contrast, ALCI 10 includes a rectifier bridge rather than a voltage dropping resistor. The elimination of the rectifier bridge enables the overall size of ALCI 11 to be slightly smaller than ALCI 10.

Test circuit 21 comprises a test switch 49 and a current limiting resistor 51. It is the function of test circuit 21 to provide a means for testing if appliance leakage current interrupter 11 is functioning properly. Test switch 49, which is preferably a normally open, single pole single throw switch, serves to energize the test circuit when in the closed position. Test switch 49 is opened and closed through the depression of a manually operated button 20D1. Resistor 51, which preferably has a value of 15 Kohms, serves to provide a simulated fault current to test circuit 21, similar to a limit condition which would be detected by fault detection circuit 17.

Figure 28:
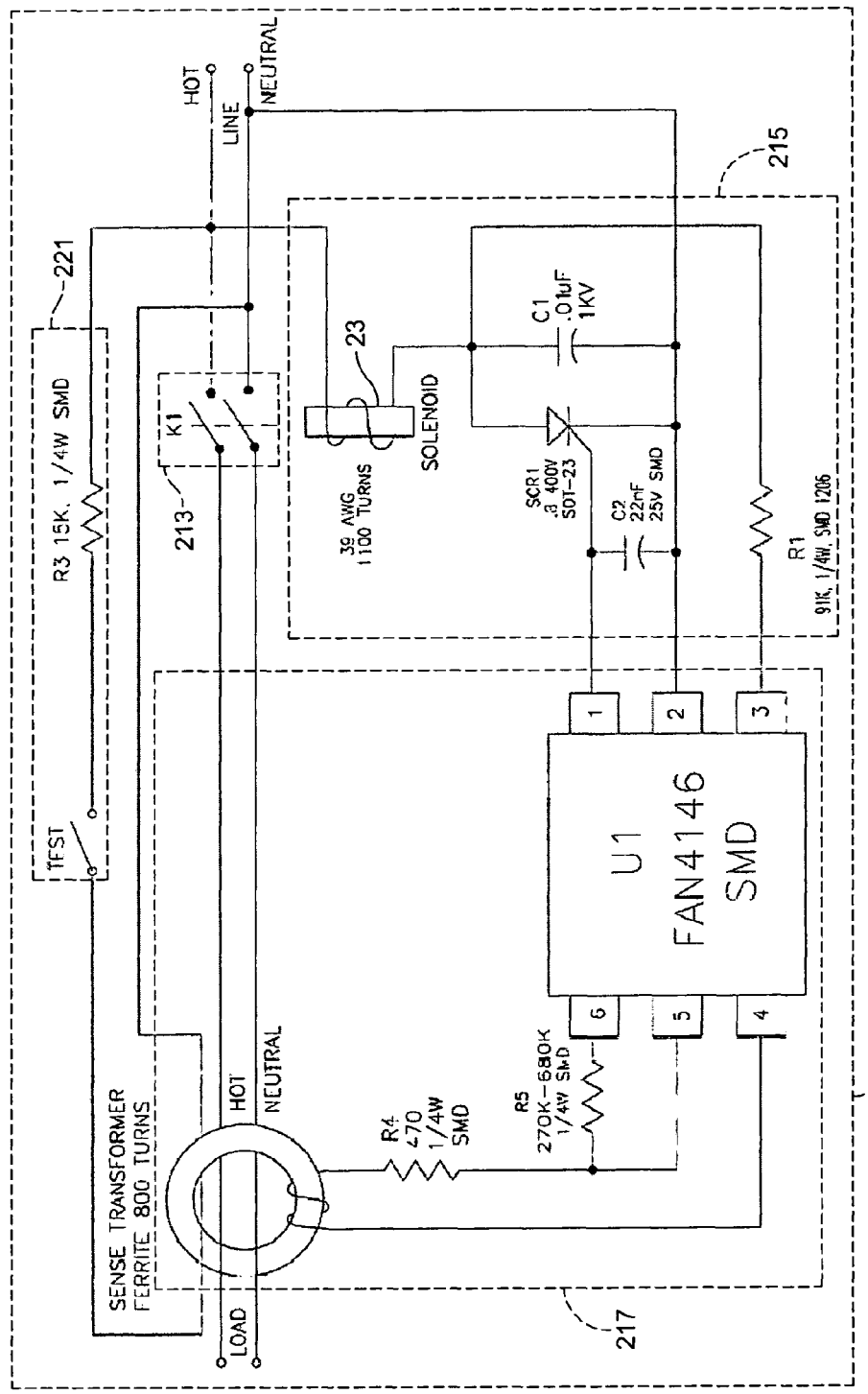

Referring to FIG. 28 a second alternative embodiment circuit diagram for a miniature appliance leakage current interrupter (ALCI) 211 is disclosed. Circuit breaker 213 comprises a pair of normally closed switches which are located in the hot and neutral lines, respectively, between the power source and the load. Switches K1 remain in the closed position until such time as fault detection circuit 217 detects the presence of a ground fault condition, at which time switches K1 open. Once open, switches K1 remain open until a reset button is manually depressed to close the switches.

Relay circuit 215 comprises a solenoid, a silicon controlled rectifier (SCR1), capacitors C1, C2 and resistor R1. Solenoid 23 is connected to hot line H and serves the function of selectively opening switches K1 upon the detection of a ground fault condition. Rectifier SCR1 is connected to both the solenoid and fault detection circuit 217 and serves to energize the solenoid upon the detection of a ground fault condition. Capacitor C2 is connected in parallel to rectifier SCR1 and fault detection circuit 17 and serves as a noise suppression filter. Capacitor C2 preferably has a value of 22 nf and acts to filter out noise occurring in circuit 11 which could mistakenly cause rectifier SCR1 to energize the solenoid.

Fault detection circuit 217 comprises a sense transformer, an integrated circuit (IC) chip UI, a resistor R4 and resistor R5. The secondary winding of the sense transformer is directly DC coupled to the inverting input of the sense amplifier at PIN 5. Resistor R5 converts the sense transformers secondary current to a voltage at PIN 6. It is the function of fault detection circuit 217 to detect the presence of a ground fault condition in the hot and neutral lines. Furthermore, upon the detection of a ground fault condition, occurring when the voltage at PIN 6 exceeds a threshold voltage, fault detection circuit 217 generates an output signal on PIN 1 which is applied to relay circuit 215 which opens circuit breaker 213.

The Sense Transformer of fault detection circuit 217 preferably includes a ferrite core having an 800 turn winding secondary winding. It is the function of the sense transformer to sense current differentials between hot line H and neutral line N and induce an associated output to secondary winding, integrated circuit chip UI is preferably a FAN 4146 model chip manufactured by FAIRCHILD Semiconductor.

Figure 29:
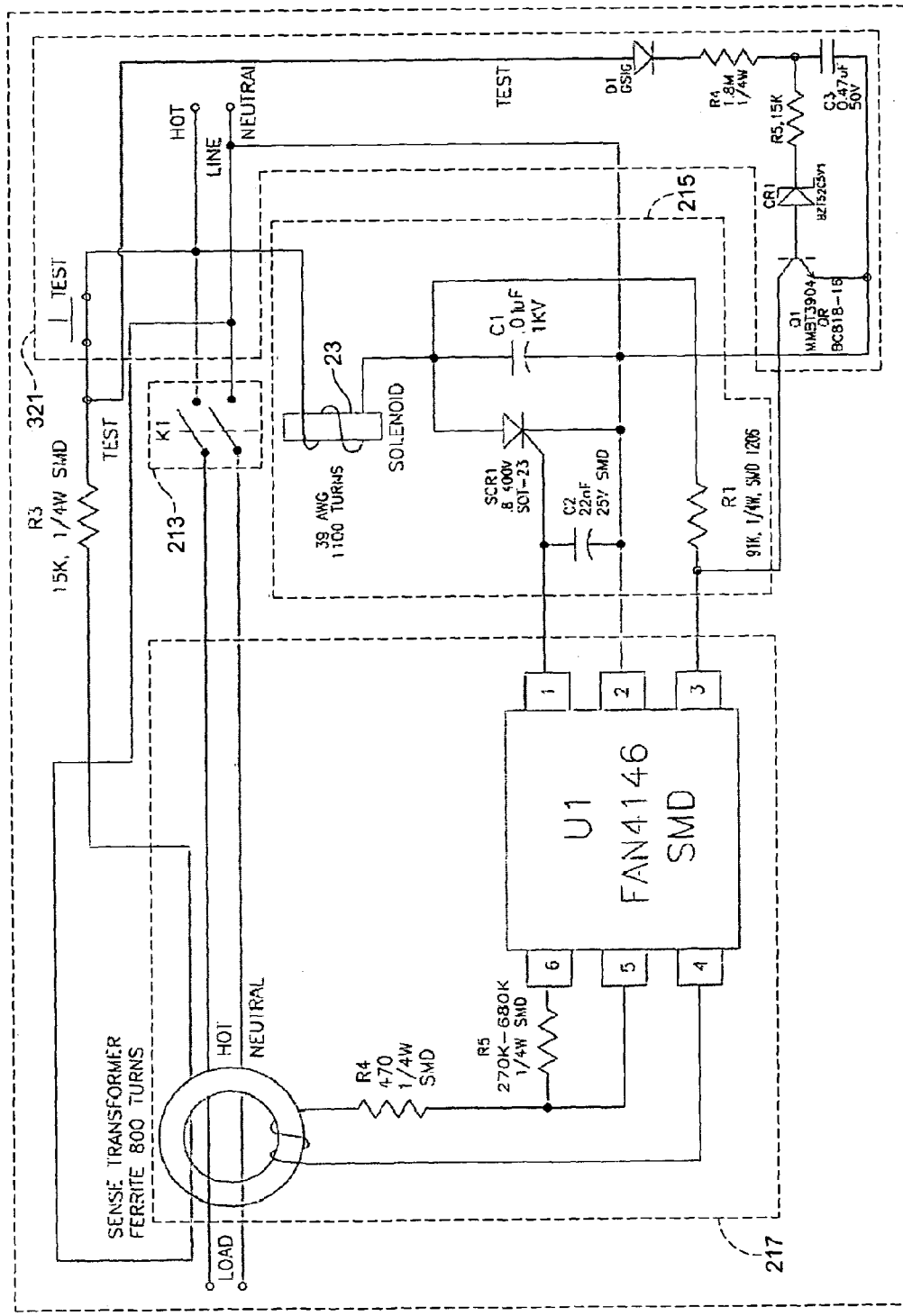

Referring to FIG. 29 a third alternative embodiment circuit diagram for a miniature appliance leakage current interrupter (ALCI) 311 is disclosed. As shown in FIG. 29, ALCI 311 comprises the same circuit components as ALCI 211, with the addition of a test circuit 321.

The circuit embodiments of FIGS. 27-29 may further include the addition of a passive ferrite bead for RF Suppression. A Ferrite bead helps to prevent unwanted RF noise from being coupled into fault detection circuits 27-29 to prevent an unwanted triggering of relay circuit 15 and 215. A Ferrite bead may be placed at the output of the sense transformer secondary windings. It will be appreciated that any suitable passive electric component may be used to suppress unwanted frequency noise.

In use, the appliance leakage current interrupters disclosed in FIGS. 27-29 detect ground fault conditions. Specifically, ground fault conditions result when the differential in the currents in the hot and neutral lines exceeds a predetermined value. For example, a ground fault condition may result from an accidental grounding of the hot line. Ground fault conditions can lead to excessive current flow which can cause dangerous voltages to be present at points that should be ground potential, which can be extremely dangerous. The Fault detection circuits disclosed in FIGS. 27-29 detect the presence of a ground fault condition and generate a ground fault condition output signal which is applied to a relay circuit. In turn, the relay circuit serves to open up circuit breaker which opens the circuit, thereby preventing further ground fault current to flow.

Figure 5:
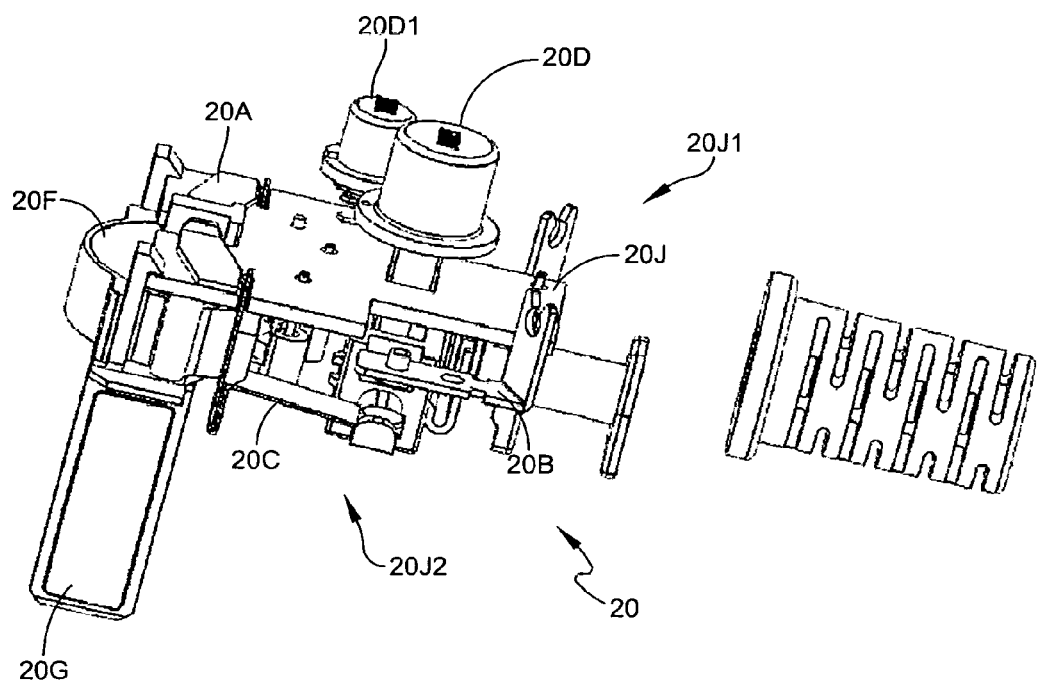
FIGS. 5-6 is a first embodiment ALCI circuit card assembly for inclusion in the ALCI housing of FIGS. 1,2.
Figure 6:
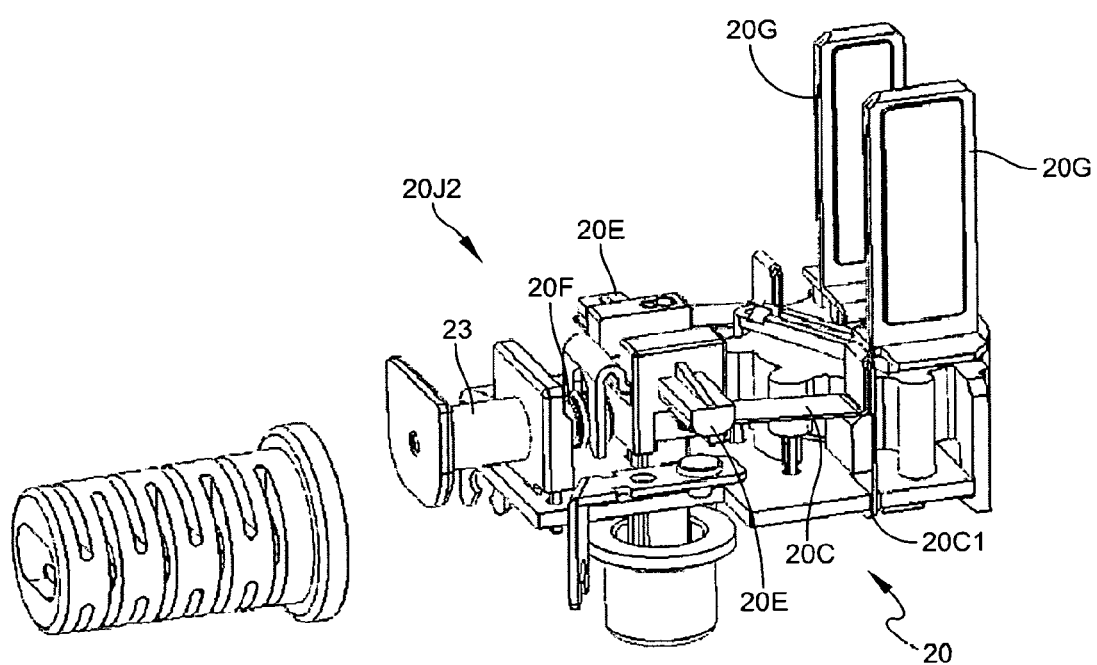
Figure 13:
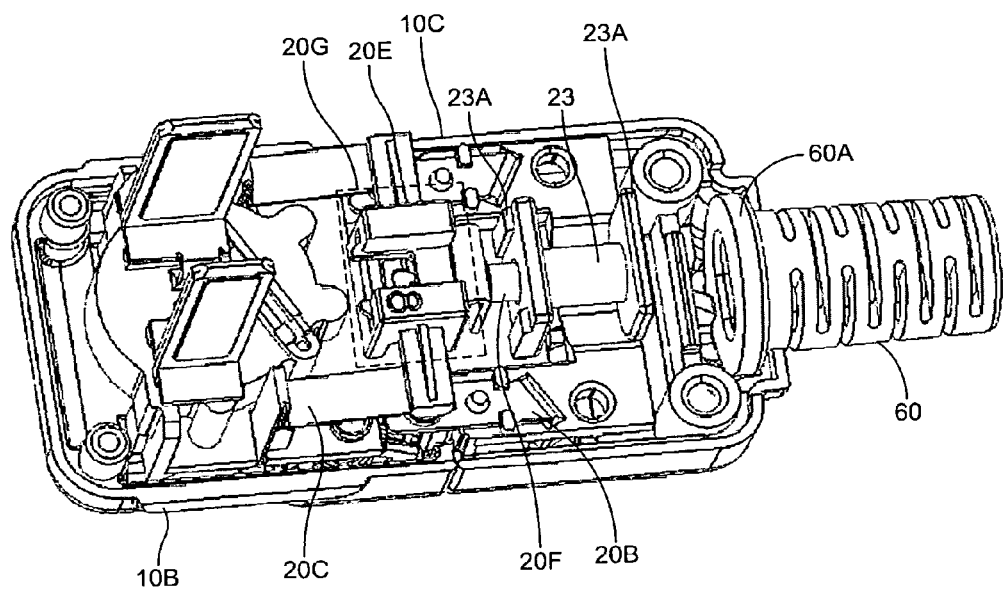
Figure 14:
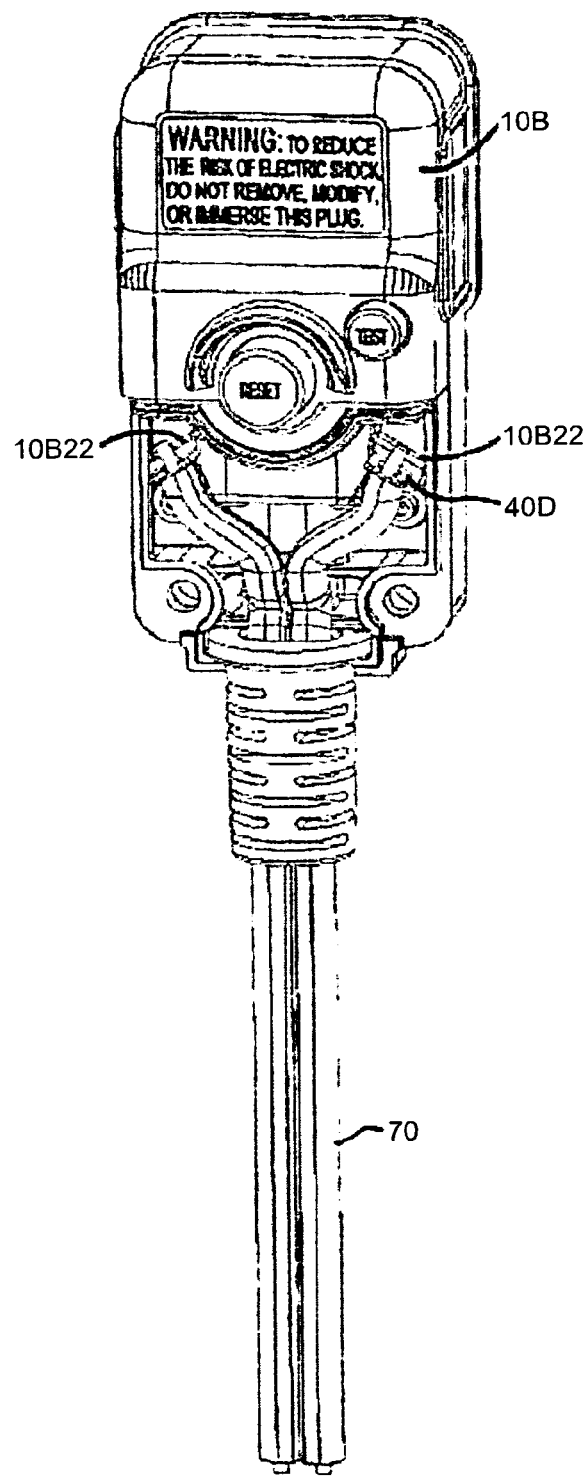
FIG. 14 illustrates the circuit of FIGS. 5-6 integrated into the top housing of FIGS. 8-9.

The circuit diagrams disclosed in FIGS. 27-29, for a miniature appliance leakage current interrupter (ALCI) constructed in accordance with the principles of the present invention all include the circuitry for a circuit breaker, a relay circuit, a fault detection circuit, and a test circuit. These circuit components may be included in either the ALCI Circuit Card Assemblies illustrated in FIGS. 5-6 (First Embodiment) or FIGS. 15-17 (Second Embodiment). Referring to FIGS. 5-6, and FIG. 13 Circuit Card Assembly 20 includes a circuit card 20J having a top side 20J1 and a bottom side 20J2. Bottom side 20J2 includes at one end a sense coil housing 20F having source input conductors 20G fixedly attached and projecting through sense coil housing 20F then terminating into a bus bar 20A on top side 20J1.

Bottom side 20J2 further includes a moveable contact arm 20C having at one end a bus bar 20A interface portion 20C1. Portion 20C1 projects through circuit board 20J contacting bus bar 20A on top side 20J1. Moveable contact arms 20C are resiliently flexible and includes at its opposite end an actuating member 20E which is biased in the normally open position. Referring to FIG. 13, Stationary housing assembly 20G houses actuating member 20E to reciprocate movable contact arm 20C when manually energized through reset switch 20D.

Further disposed on bottom side 20J2 is plunger mechanism 20F operable by solenoid 23 to release actuating member 20E from a closed position to an open position upon the detection of a ground fault. Solonoid 23 extends beyond circuit card 20J, and Output terminals 20B are fixed independent of circuit card 20J within the housing (discussed below). This allows for a smaller footprint PCB circuit card assembly. The components of the electric circuits of FIGS. 27-29, not otherwise mentioned above, are mounted on circuit board 20J so as to facilitate the connection of the components and so as to reduce the overall size of the unit. The components are then soldered and interconnected through conductive paths and patterns which are located on circuit board 20J.

Figure 15:
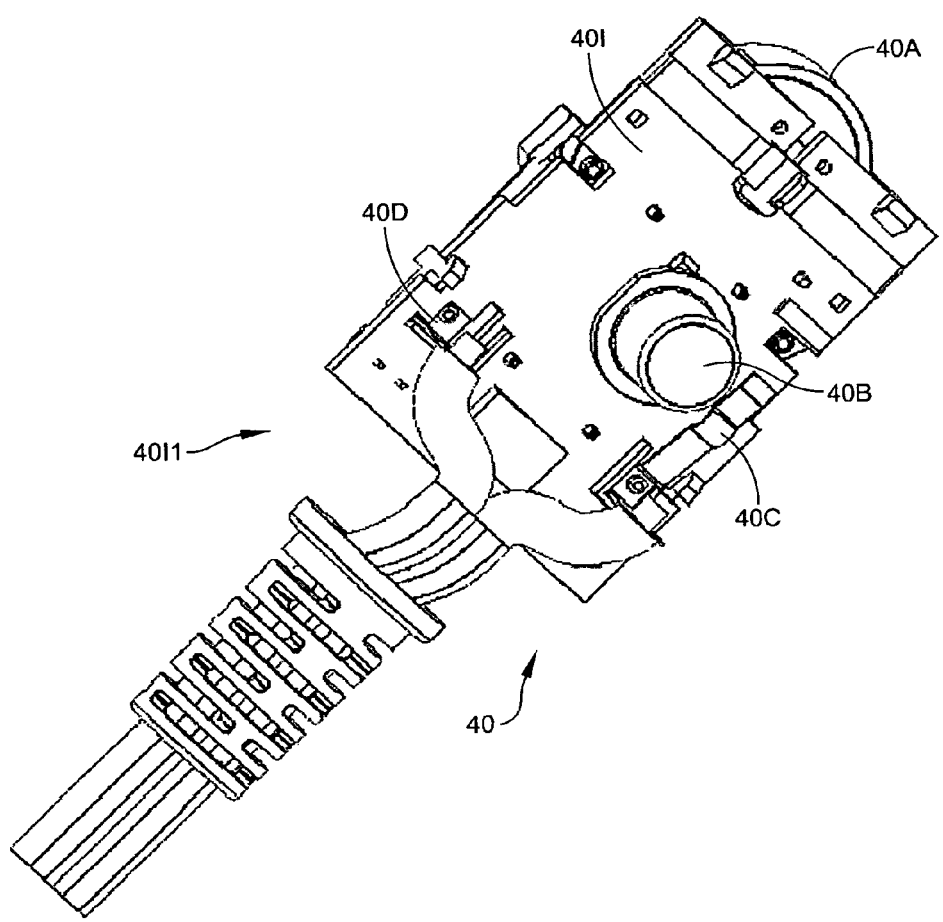
FIGS. 15-17 illustrates the second embodiment ALCI circuit card assembly for inclusion in the ALCI housing of FIGS. 3,4.
Figure 16:
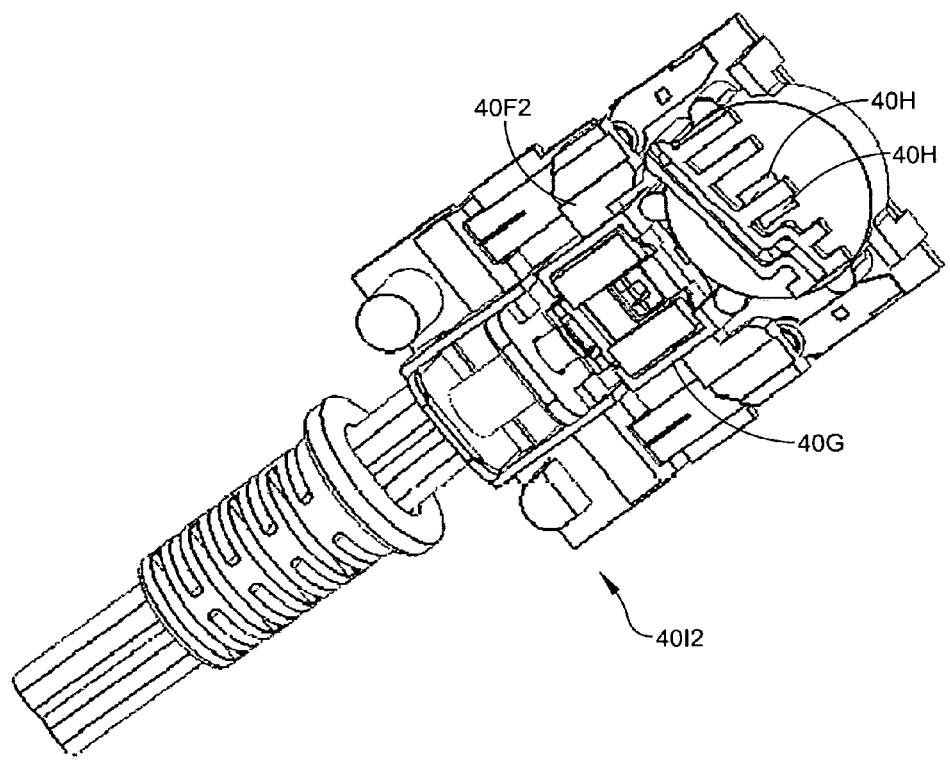
Figure 17:
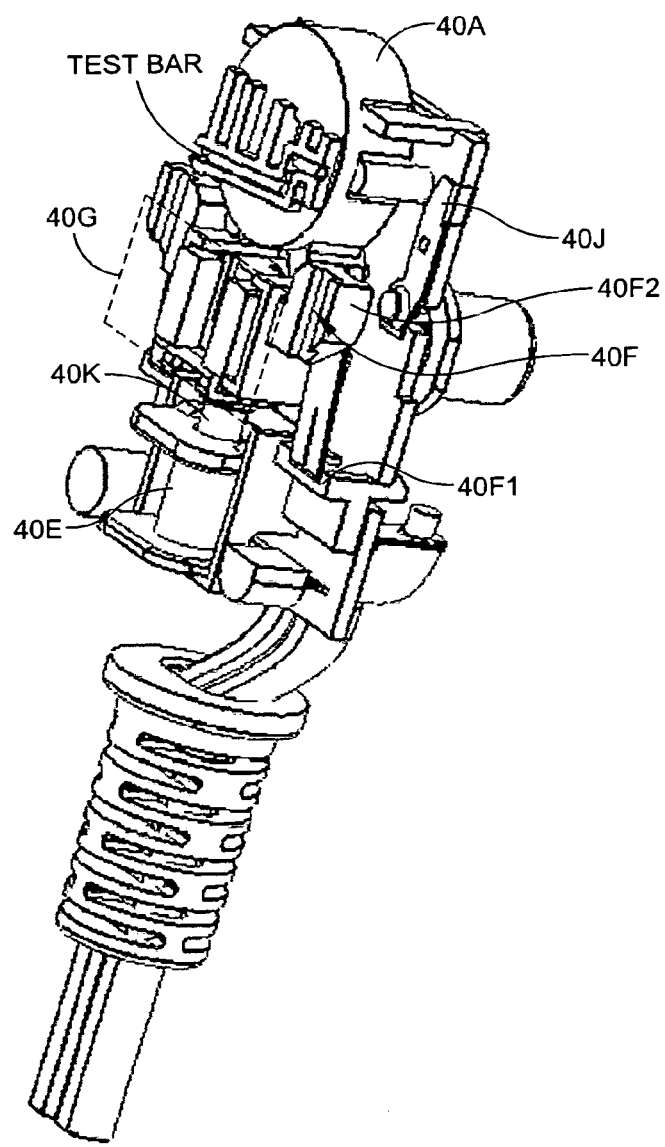

The overall dimensions of circuit card 20J are approximately 1 inch wide by 1.5 inches long accommodating the circuit components of FIGS. 27-29, having the physical layout of components described above for proper placement within enclosures described herein. FIGS. 15-17, Circuit Card Assembly 40, includes a circuit card 401 having a top side 4011 and a bottom side 4012. Bottom side 4012 includes at one end a sense coil housing 40A having an input opening 40H for a source input conductor. Adjacent to sense coil housing 40A, and disposed on bottom side 4012 are contact terminals 40J having a conductive path to the source input conductor opening 40H.

Bottom side 4012 further includes moveable contact arms 40F having at one end a load output connection 40F1. Portion 40F1 projects through circuit board 401 contacting output terminals 40D on top side 4011. Moveable contact arms 40F are resiliently flexible and include an actuated member 40F2 which is biased in the normally open position. Stationary housing assembly 40G houses actuating member 40F2 to reciprocate movable contact arm 40F when manually energized through reset switch 40B.

Further disposed on bottom side 4012 is plunger mechanism 40K operable by solenoid 40E to release actuating member 40F2 from a closed position to an open position upon the detection of a ground fault. The components of the electric circuits of FIGS. 27-29, not otherwise mentioned above, are mounted on circuit board 401 so as to facilitate the connection of the components, and so as to reduce the overall size of the unit. The components are then soldered and interconnected through conductive paths and patterns which are located on circuit board 401.

The overall dimensions of circuit card 401 are approximately 1 inch wide by 1.5 inches long accommodating the circuit components of FIGS. 27-29, having the physical layout of components described above for proper placement within enclosures described herein.

Figure 1:
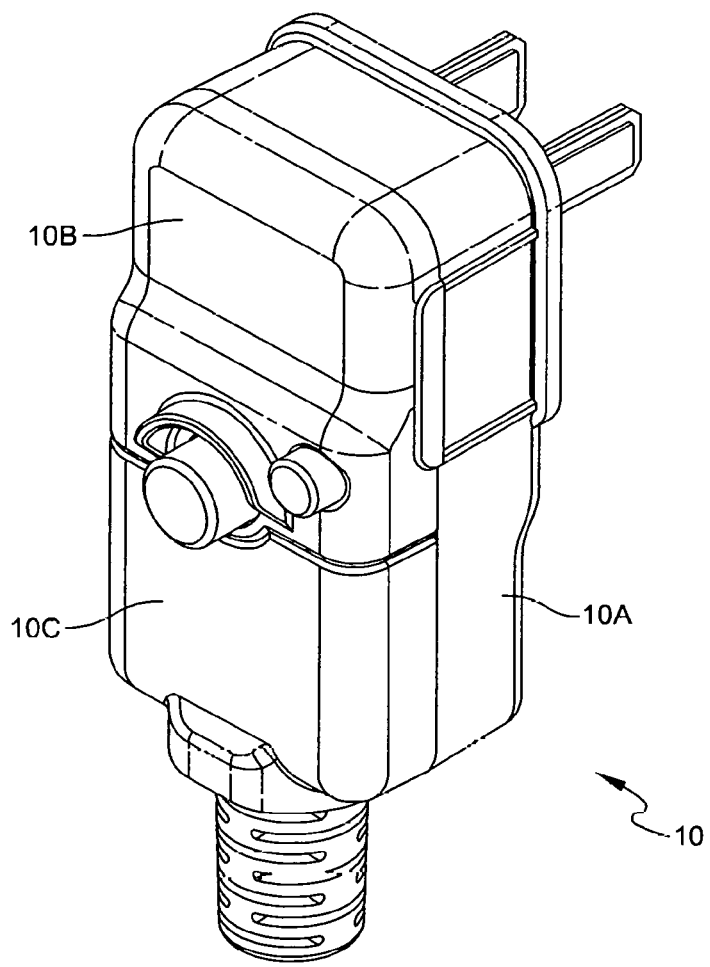
FIGS. 1, 2 are perspective views of a first embodiment appliance leakage current interrupter housing.
Figure 2:
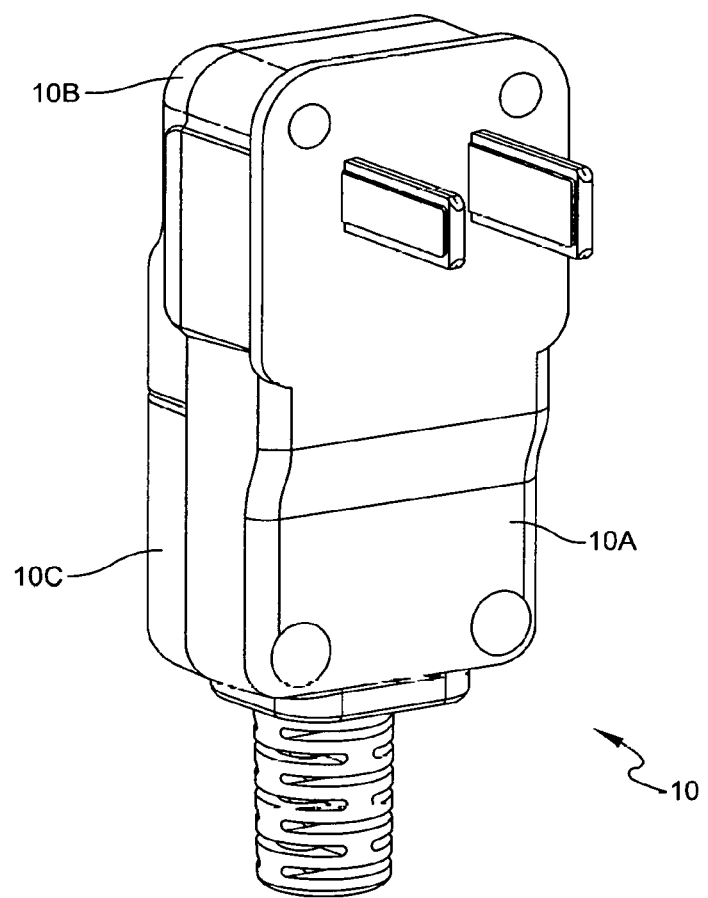
Figure 8:
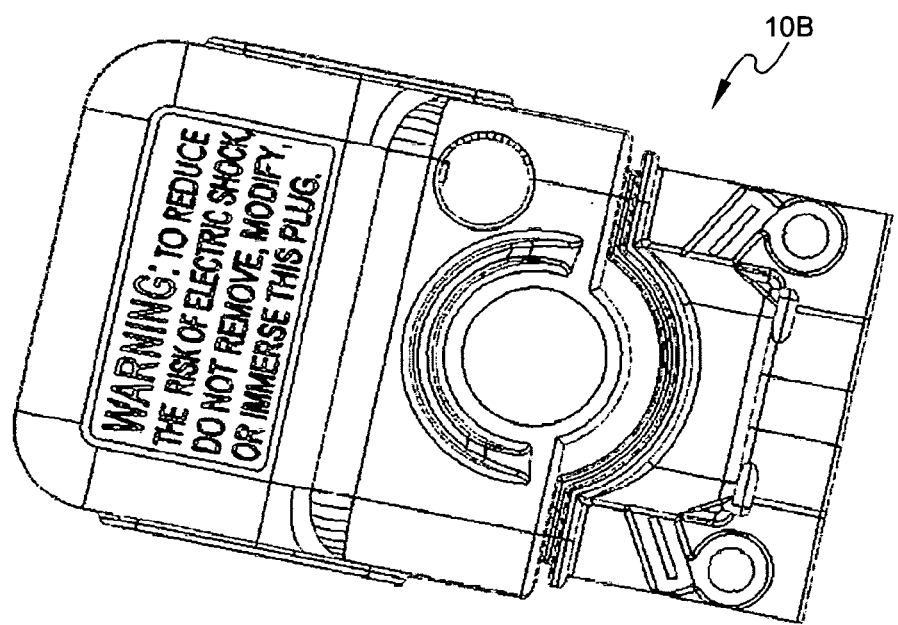
FIGS. 8,9 illustrate the top portion of the first embodiment housing of FIGS. 1,2.

Referring to FIGS. 1,2 a first embodiment of a mini-ALCI is disclosed. The ALCI housing of FIGS. 1,2 encases the Circuit Card Assembly 20 of FIGS. 5-6. Referring to FIGS. 1,2 the first embodiment ALCI 10 includes a bottom housing 10A, a top housing 10B, and a wire cover 10C. Referring to FIGS. 5, 8, and 13, and first to FIG. 13, FIG. 13 illustrates Circuit Board Assembly 20 of FIG. 5, inserted into top housing 10B. FIG. 13 further illustrates wire cover 10C in place to secure the placement of cord bushing 60. Cord bushing 60 is fixedly attached and surrounds the end of a load cord (not shown) and includes a lip 60A inserted in a wire cover 10C frame cavity 10C1, the lip extending beyond the inner edge 10C2 of wire cover 10C to secure the bushing 60 therein (See FIG. 13).

Figure 9:
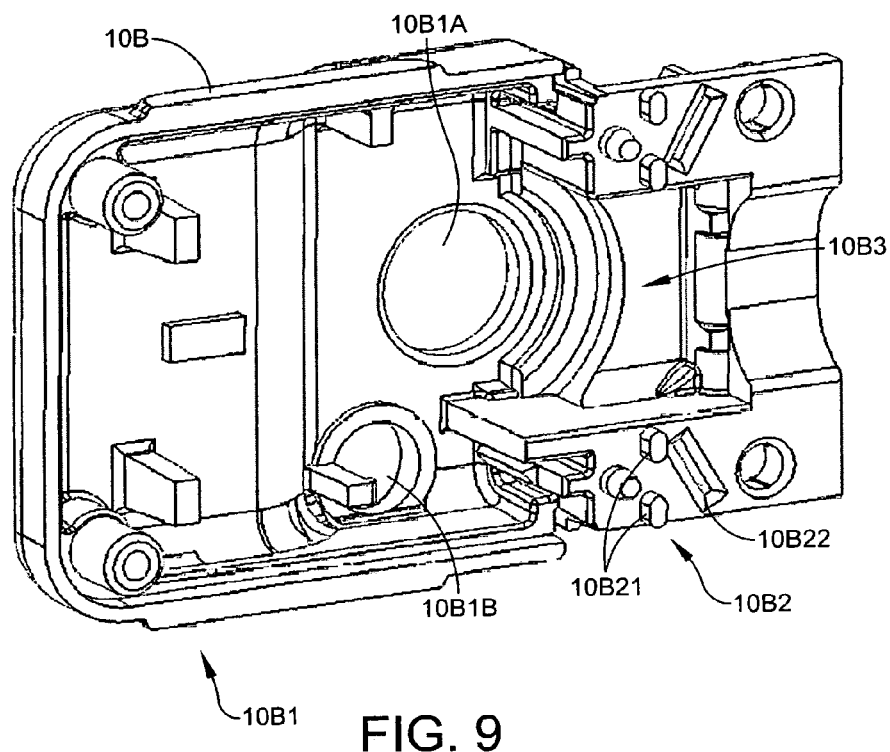
Figure 10:
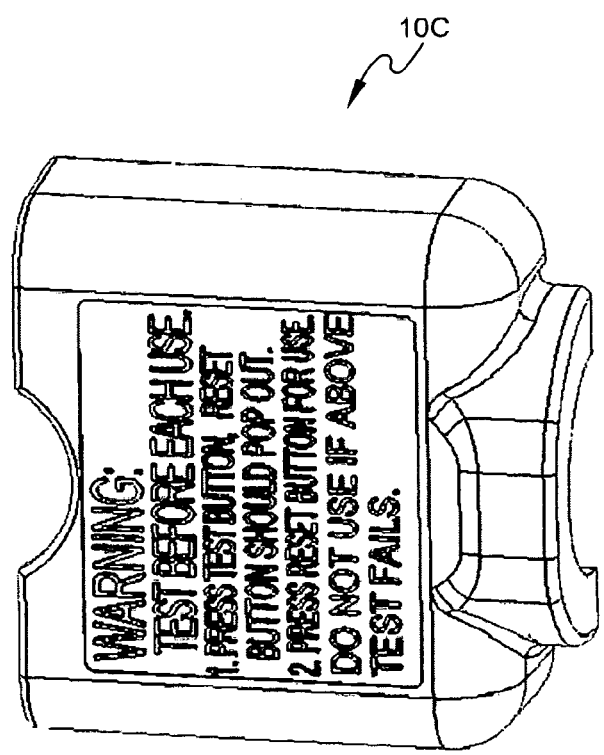
FIGS. 10-11 illustrate the wire cover portion of the first embodiment housing of FIGS. 1,2.
Figure 11:
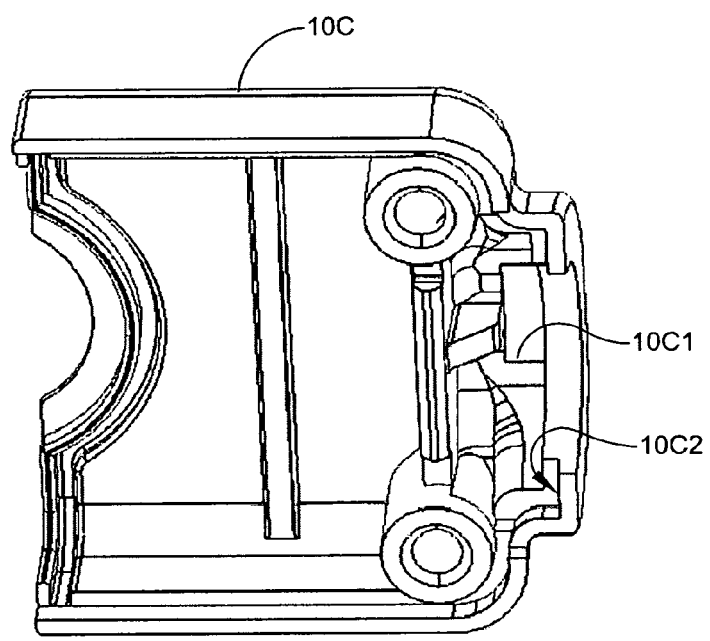
Figure 12:
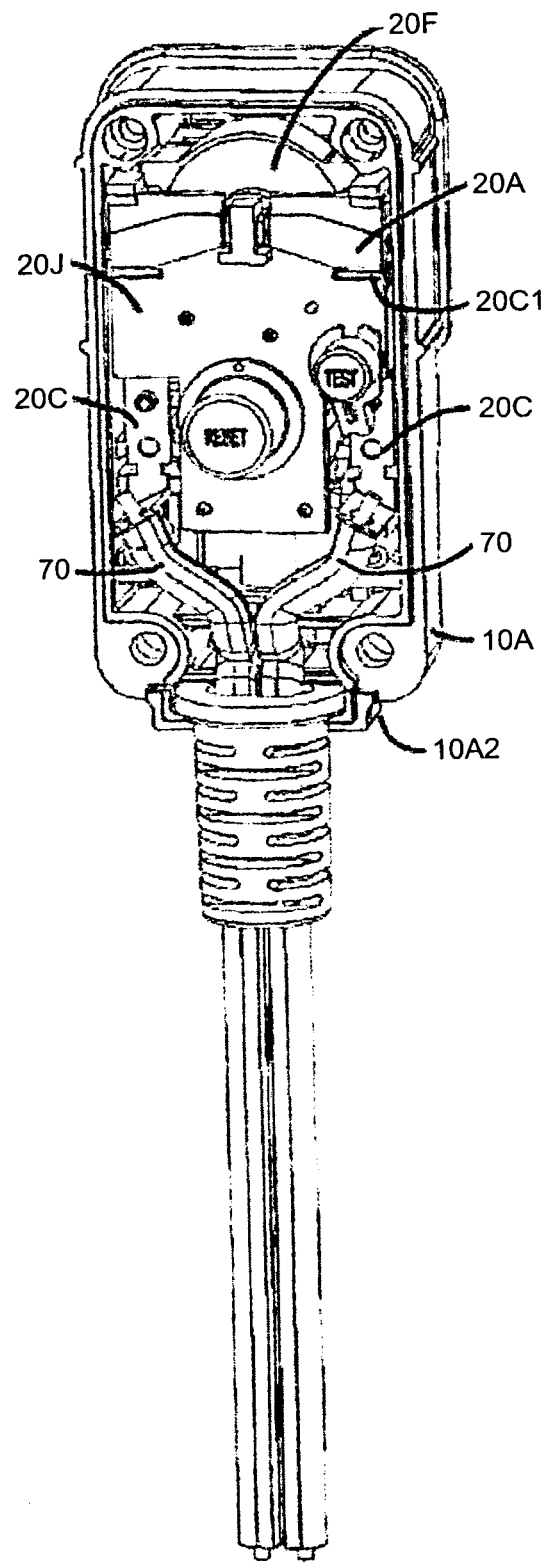
FIGS. 12, 13 illustrate the circuit of FIGS. 5-6 integrated into the top housing of FIGS. 8-9.

Referring to FIG. 5 and FIG. 9, Top Housing 10B includes a top housing first section 10B1 and a top Housing second section 10B2. Top Housing first section includes openings 10B1A and 10B1B for engagement therethrough of reset button 20D and test button 20D1 respectively. Second section 10B2 includes output terminal 20B securement tabs 10B21 and output terminal guide openings 10B22 for securement of load output terminals 20B. As illustrated in FIG. 13, load output terminals 20B fall in alignment with actuating members 20E with one end projecting through the guide openings 10B22 for connection to a load input cable 60 as illustrated in FIG. 12. As illustrated in FIG. 9, Top housing 10B further includes a channel 10B3 for securement of solenoid 20D therein.

Figure 7:
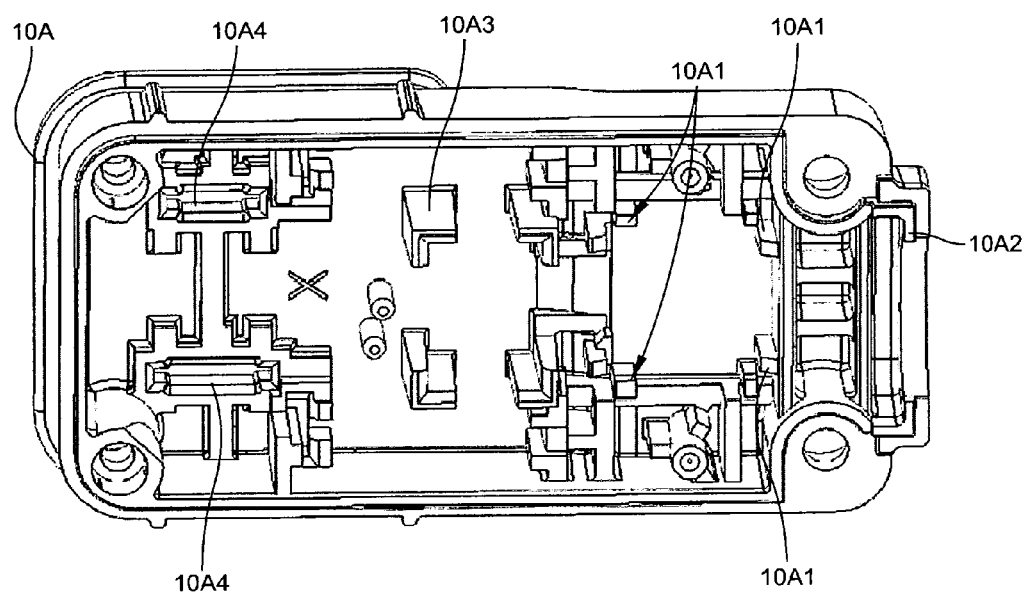
FIG. 7 illustrate the bottom portion of the first embodiment housing of FIGS. 1,2.

Referring to FIG. 7, bottom housing 10A is illustrated and includes openings 10A4 for the passage of source input conductors 20G at an angle approximately 90 degrees relative to the longitudinal axis of a load input cable 70. Bottom housing 10A includes frame members 10A3 to secure stationary housing assembly 20G and further includes frame members 10A1 to secure solenoid 23. FIG. 12 illustrates the placement of bottom housing 10A onto Circuit Card Assembly 20.

Figure 3:
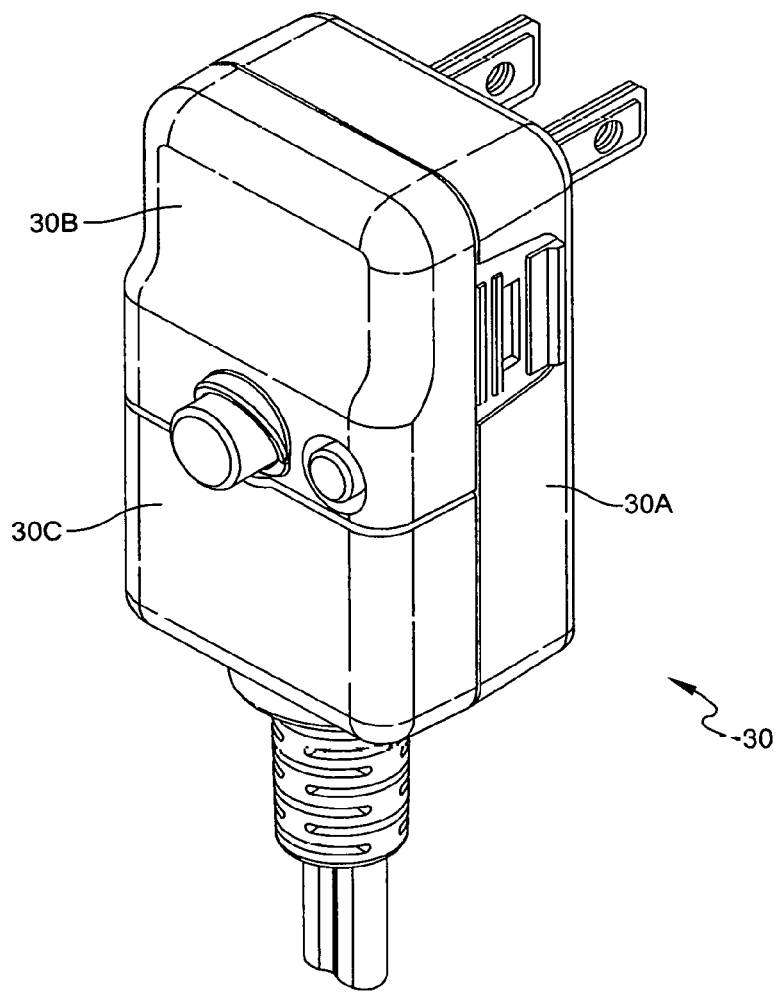
FIGS. 3, 4 are perspective views of a second embodiment appliance leakage current interrupter housing.
Figure 4:
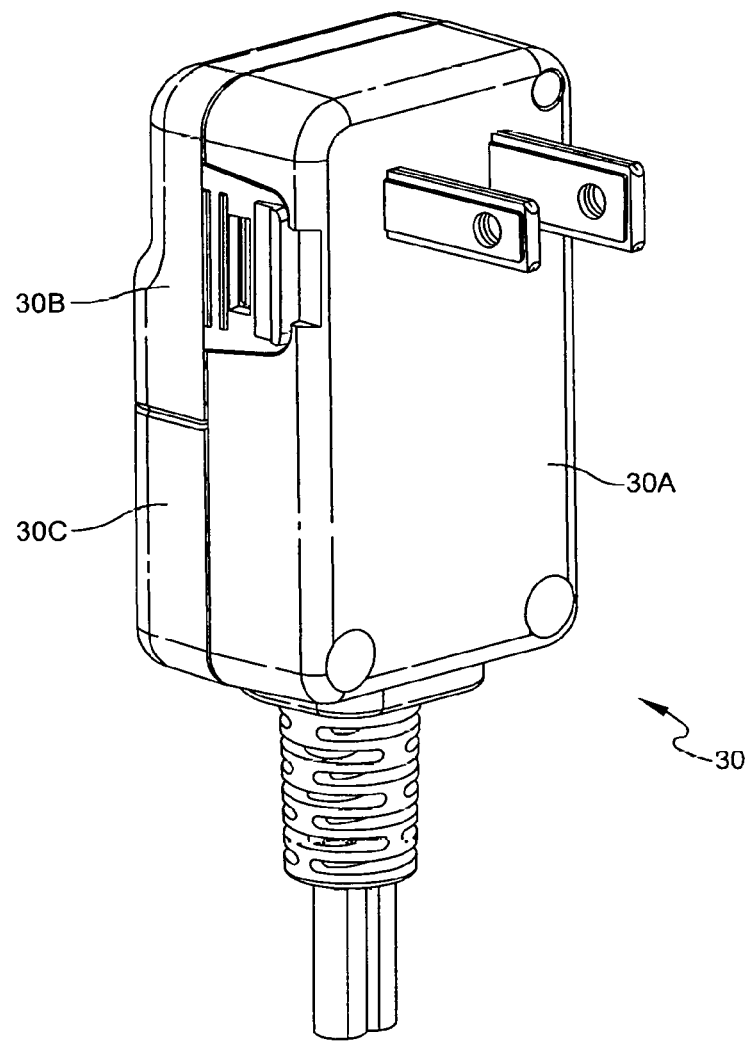

Referring to FIGS. 3 and 4 a second embodiment of a mini-ALCI is disclosed. The ALCI of FIGS. 3,4 encases the Circuit Card Assembly 40 of FIGS. 15-17. Referring to FIGS. 3,4 the second embodiment ALCI 30 includes a bottom housing 30A, a top housing 30B, and a wire cover 30C.

Figure 18:
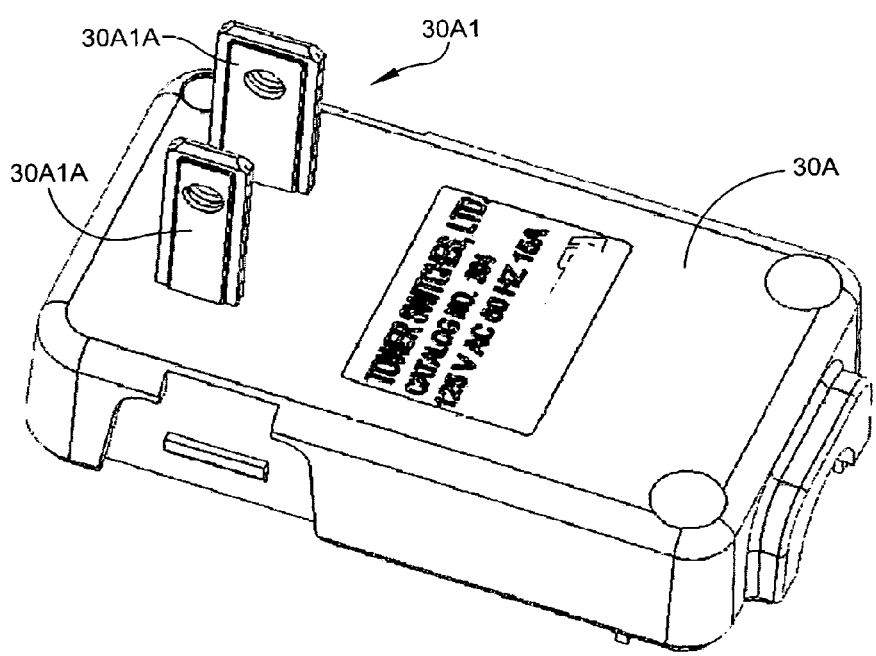
FIGS. 18-19 illustrates the bottom portion of the second embodiment housing of FIGS. 3,4 further illustrating integrated first and second contact prongs.
Figure 19:
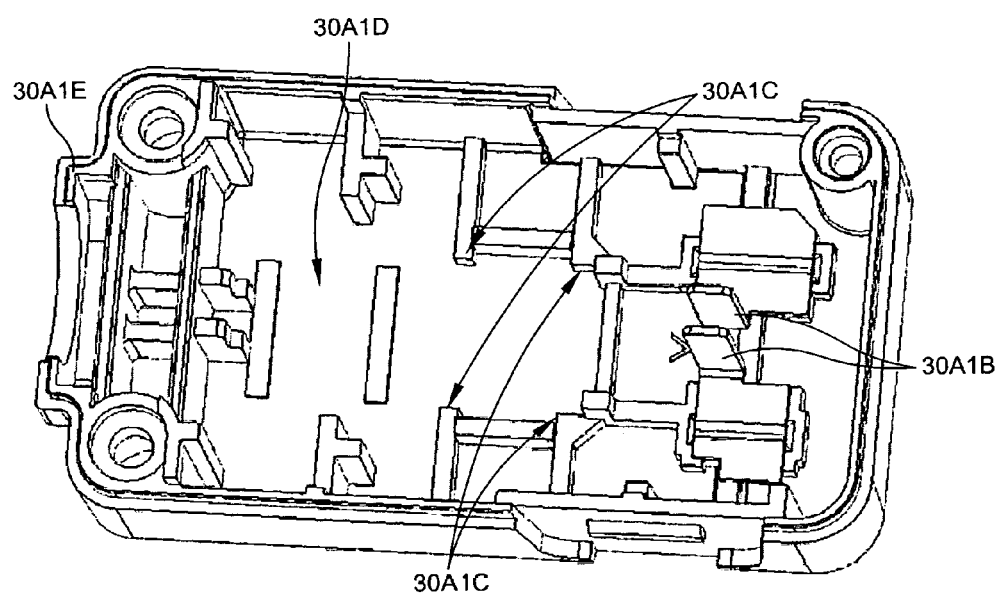
Figure 20:
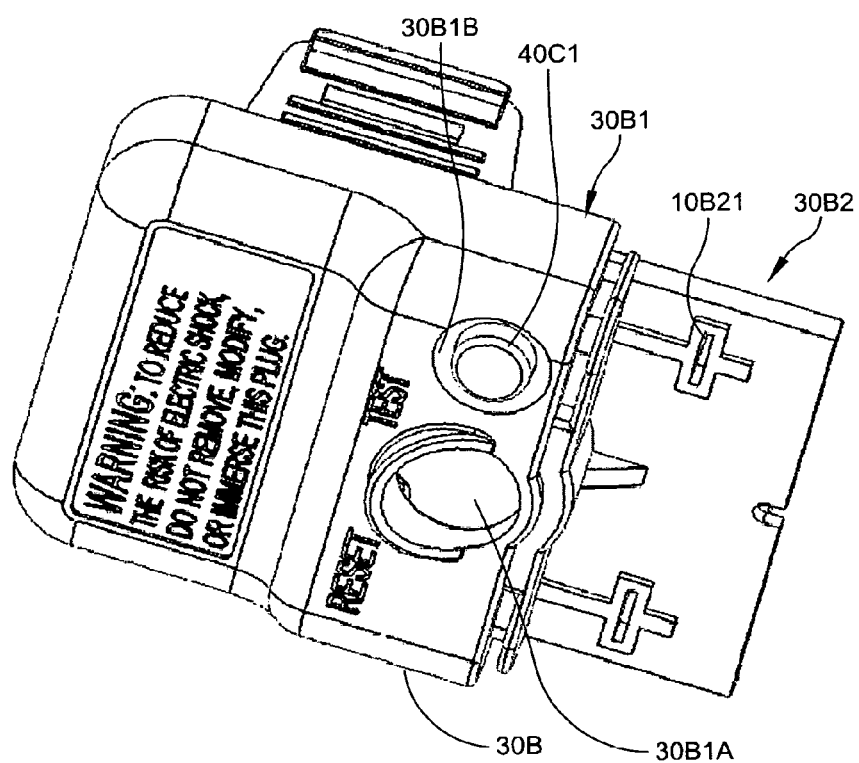
FIGS. 20,21 illustrates the top portion of the second embodiment housing of FIGS. 3,4.
Figure 21:
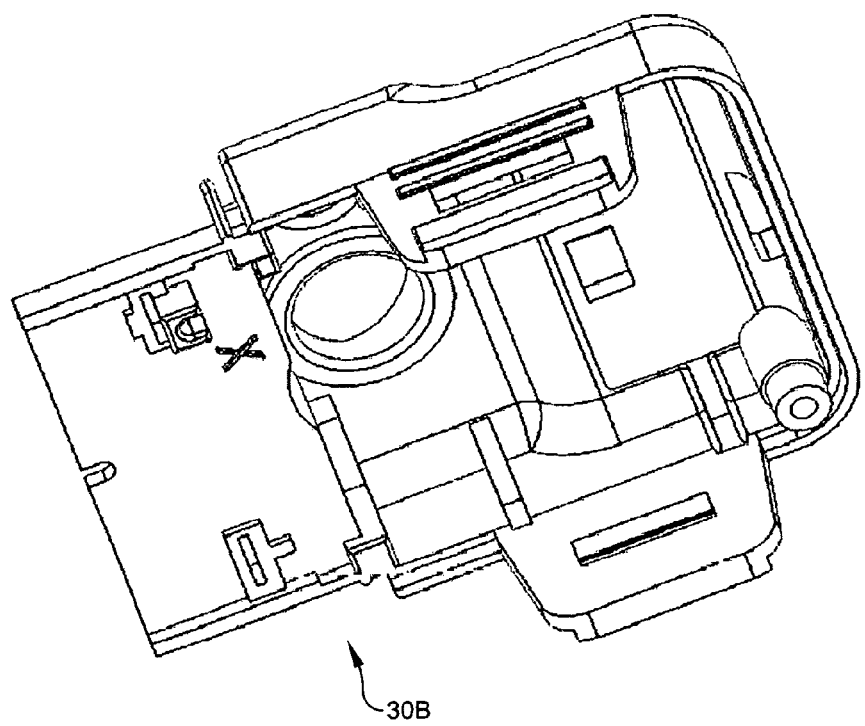
Figure 22:
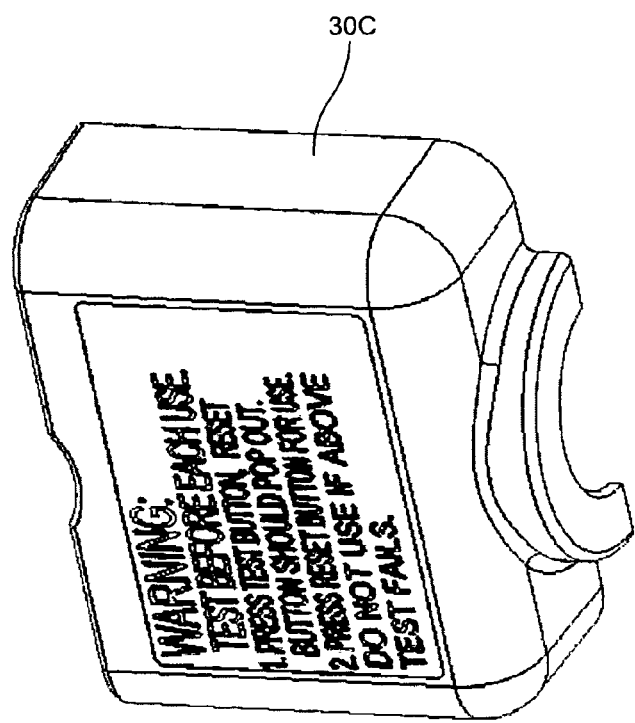
FIGS. 22, 23 illustrates the wire cover portion of the second embodiment housing of FIGS. 3, 4.
Figure 23:
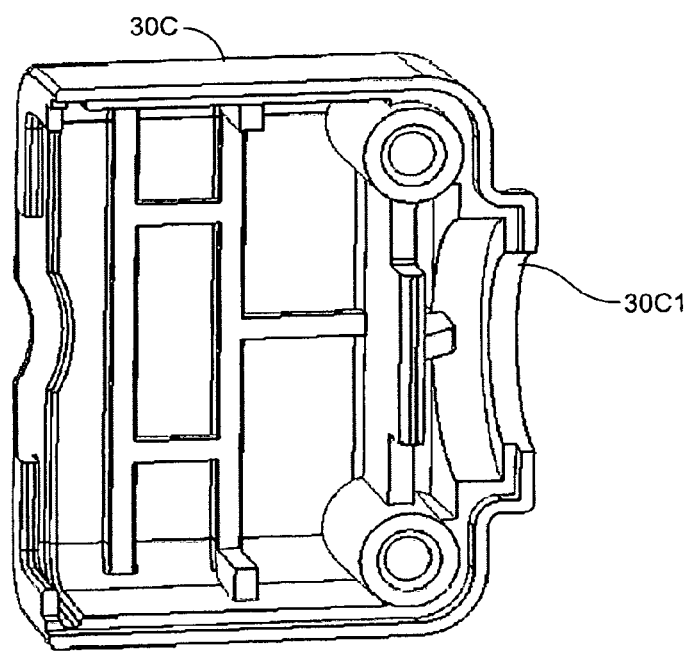
Figure 24:
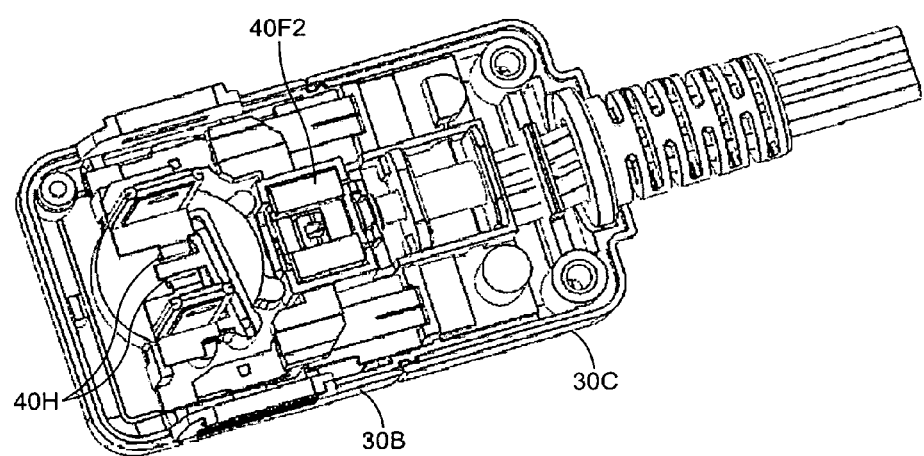
FIG. 24 illustrates the circuit of FIGS. 16-17 integrated into the top portion of FIGS. 20, 21.
Figure 25:
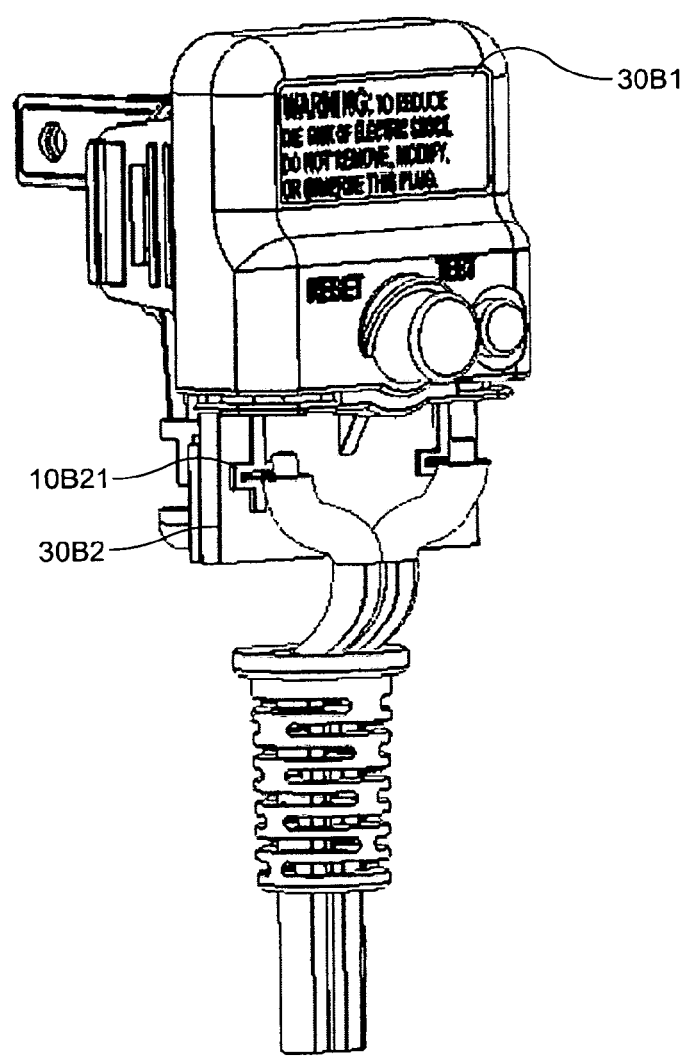
FIG. 25 illustrates the housing of FIGS. 3,4 with the wire cover portion removed.
Figure 26:
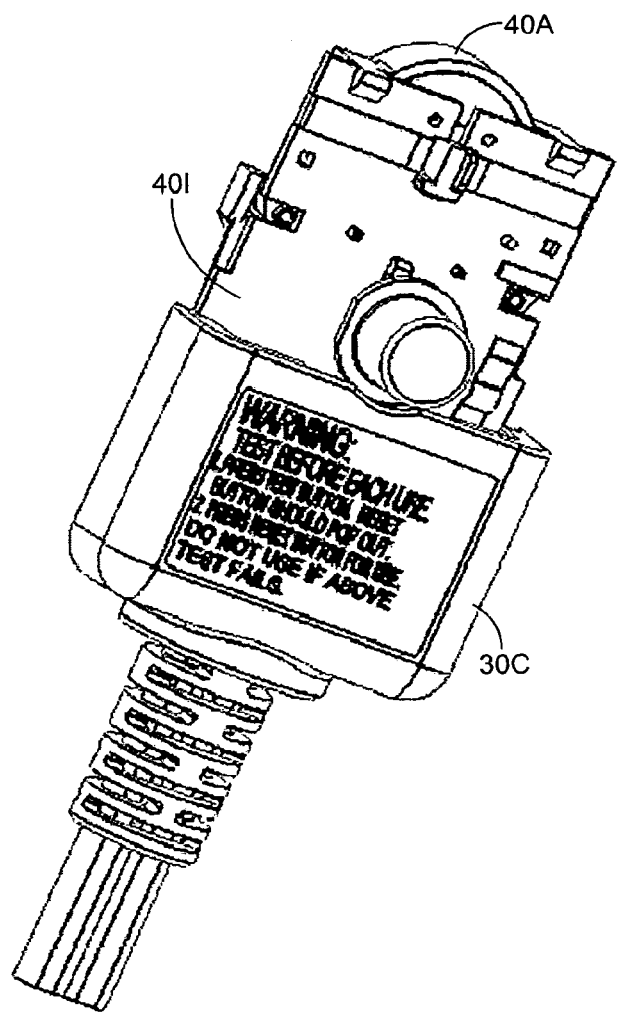
FIG. 26 illustrates the circuit of FIGS. 15-17 having only the wire cover attached.

Referring to FIGS. 18-20, Top Housing 30B includes a top housing first section 30B1 and a top Housing second section 30B2. Top Housing first section includes openings 30B1A and 30B1B for engagement therethrough of reset button 40B and test button 40C 1 respectively. Second section 30B2 includes output terminal guide slots 10B21 as illustrated in FIGS. 20 and 25.

As illustrated in FIGS. 18 and 19, Bottom housing 30A includes a frame 31A1E for cord bushing securement, as previously described for embodiment 1, and a plurality of frame members (30A1C, 30A1D), for securement of the components of circuit card assembly 40. Bottom housing 30A further includes integrated input conductors 30A1 having a first end 30A1A for engagement with a power source and a second end 30A1B protruding into the interior of bottom housing 30A. Input conductors 30A1B are adaptable for engagement into sense coil housing 40A input opening 40H (FIG. 16) when circuit board 40 is set in bottom housing 30A.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

I claim:

1. An appliance leakage current interrupter (ALCI) for interrupting the flow of current through a pair of lines extending between a source of power and a load, said appliance current leakage interrupter comprising:
 a housing having a top cover, a bottom cover, and a wire cover, said top cover comprising a first section and a second section, a top and a bottom; said second section further including a plurality of load input terminals, said load input terminals for connecting a load input to the remainder of said appliance current leakage interrupter, said appliance current leakage interrupter including a plurality of movable contact arms, said load input terminals integrated into said top cover second section, wherein said top cover second section further comprises a plurality of guide openings therethrough and means for securing said load input terminals to said bottom of said second section, said load input terminals having a first end, a middle portion and a second end, said first end connected to said load input, said middle portion extending through said second section top of said top cover and projecting through said guide openings into said second section bottom of said top cover and extending to said second end, said second end in alignment with said movable contact arms, said movable contact arms adaptable for engagement with said load input terminals second ends when said ALCI is manually energized to the normally closed position.

2. The ALCI of claim 1 further comprising:
 a circuit card assembly having a top side, a bottom side, and an outer periphery, said bottom side at one end including a sense transformer, said sense transformer including a plurality of source input conductors projecting outward therefrom, said bottom side of said circuit card assembly including said plurality of movable contact arms, said movable contact arms at a first end connected to said sense Transformer, said plurality of contact arm at a second end adaptable for engagement with said load input terminals second ends when said ALCI is manually energized to the normally closed position.

3. The ALCI of claim 2 further comprising:
a solenoid having first and second distal ends and a main body therebetween, wherein said first distal end is mounted to said circuit board and said second distal end and said main body extend beyond said circuit board periphery.

4. The ALCI of claim 1 further comprising:
a circuit breaker having a pair of normally closed switches, one switch being located in each of the pair of lines extending between the source of power and the load,
a relay circuit for selectively opening the pair of normally closed switches, a fault detection circuit for detecting the presence of a ground fault condition in the pair of lines extending between the source of power and the load and for causing said relay circuit to open said circuit breaker when said fault condition detected exceeds a predetermined value, said fault detection circuit comprising an integrated circuit chip and a sense transformer.

5. The ALCI of claim 2 further comprises at least one bus bar disposed on said top side of said circuit card assembly, said at least one bus bar at one end connected to said to said sense transformer and at the opposite end connected to said first end of said plurality of said movable contact arms.

6. The ALCI of claim 2 wherein said source input conductors project through said bottom cover at a right angle.

7. The ALCI of claim 4 wherein said fault detecting circuit further includes at least one passive RF noise suppressor for preventing RF noise, said passive RF noise suppressor coupled to the output of said transformer.

8. The ALCI of claim 2, wherein said circuit card assembly is substantially 1.5 inches long by 1.0 inches wide, and wherein a plurality of spaced electrical circuit components are arranged on said top surface and said bottom surface of said circuit card assembly, said components adapted to minimize space while maintaining arcing and dielectric prevention distances, and wherein a plurality of circuit traces, arranged on said bottom surface of said circuit card assembly, said circuit traces adapted to minimize space while maintaining arcing and dielectric prevention distances.

9. The ALCI of claim 1 wherein said wire cover is removable to expose said load input terminal first end, said input terminal first end exposed for connection of load input cable.

* * * * *